May 13, 1947.  G. A. LYON  2,420,320
ORNAMENTAL TRIM RING FOR VEHICLE WHEELS
Filed April 10, 1944
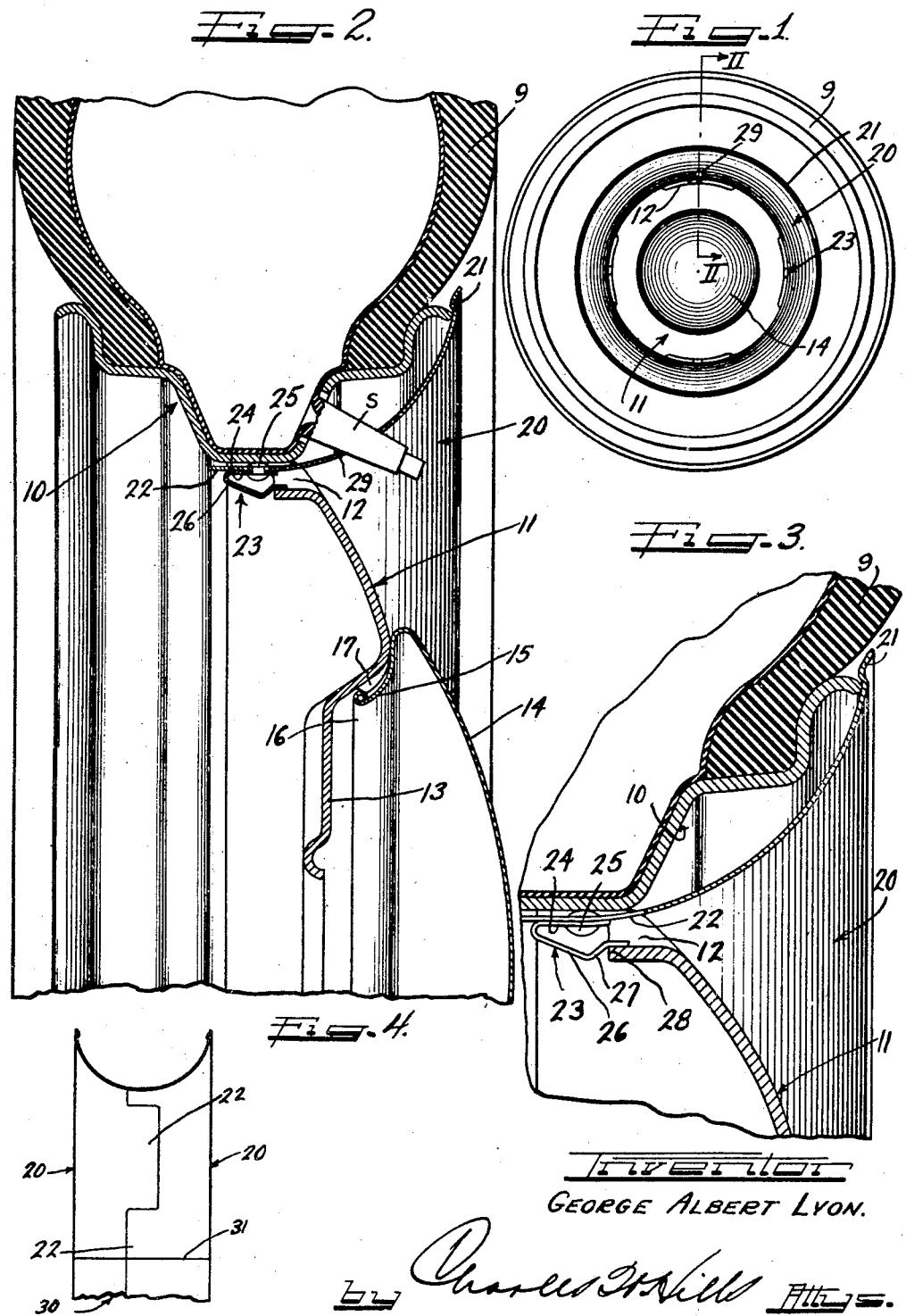
GEORGE ALBERT LYON.

Patented May 13, 1947

2,420,320

UNITED STATES PATENT OFFICE 2,420,320

ORNAMENTAL TRIM RING FOR VEHICLE WHEELS

George Albert Lyon, Allenhurst, N. J.

Application April 10, 1944, Serial No. 530,356

3 Claims. (Cl. 301—37)

This invention relates to a wheel structure and more particularly to a wheel trim therefor wherein novel means is provided for retaining the trim on the wheel without necessitating any change in the wheel structure.

An object of this invention is to provide a simplified form of wheel structure which will facilitate the use of the wheel in the normal way and yet which will afford a highly ornamental appearance for the wheel.

Another object of this invention is to utilize the conventional wheel openings in a wheel for facilitating the retention of a wheel trim on the wheel.

In accordance with the general features of this invention there is provided a wheel trim in the form of an annulus of convex-concave cross-sectional contour which covers all of the exposed side flanges of the wheel and has provided, as a component thereof, retaining means co-operating with the parts of the wheel defining the wheel openings for the retention of the same.

Another feature of the invention relates to the provision of novel retaining means for plastic a wheel trim or cover which will permit of snap-on retention of the wheel trim on the wheel.

Still another feature of the invention relates to a novel and simple way of forming the wheel trim out of plastic.

Other objects and features of this invention will more fully appear from the following detailed description taken in connection with the accompanying drawings which illustrate a single embodiment thereof, and in which:

Figure 1 is a side elevation of a wheel structure embodying the features of the invention;

Figure 2 is an enlarged fragmentary cross-sectional view taken on line II—II of Figure 1 looking in the direction indicated by the arrows and showing clearly how the cover retaining means co-operate with the wheel parts in the openings of the wheel;

Figure 3 is an enlarged fragmentary cross-sectional view corresponding to a portion of Figure 2 other than a section taken through the rim at the valve stem but showing clearly how the retaining fingers engage the wheel body in the openings of the wheels; and Figure 4 is a fragmentary diagrammatic sectional view showing how my novel wheel trim may be fabricated from plastic stock with a minimum of waste.

As shown in the drawings:

The reference character 9 designates generally a conventional type of pneumatic tire co-operable in the usual way with the conventional so-called drop-center type of metal tire rim designated by the reference character 10.

The tire rim 10, as is well known in the art, is suitably attached, as by means of welding, riveting or otherwise, to a metallic stamping comprising a wheel body which in this instance is designated by the reference character 11. This wheel body, at the intermediate intervals where it is not attached to the base flange of the rim, is provided with wheel openings 12, which, as is well known in the art, afford ventilation for the brake drum of the wheel.

The wheel body part 11 is of a shell-like configuration and has a centrally depressed flange 13 which is adapted to be secured by cap screws, bolts or the like (not shown) to a support on a vehicle such as on an axle of a wheel. This flange may be bolted to a brake drum or the like and in fact any suitable means may be provided for attaching it to the wheel.

Co-operating with the centrally depressed section of the wheel body part 11 is a metallic hub cap designated generally by the reference character 14 and which includes as a component thereof an under turned skirt which has a continuous resiliently expansible and contractible edge 16 adapted to be snapped over a plurality of retaining bumps 17 formed on the wheel body part 11.

The hub cap 14 and the means for retaining it on the wheel are now well known in the art. This metal hub cap by reason of its resilient flexible continuous edge 16 is adapted to be axially snapped or cammed into retaining engagement with the bumps 17 which are arranged in a common circle and may be of any suitable number such, for example, as 3 or 4. In other words the springy edge 16 is pressed over and behind the bumps 17 so as to detachably hold the hub cap on the wheel. This hub cap may be easily removed from the wheel by prying it off through the instrumentality of a suitable tool such as a screwdriver. Any suitable ornamentation may be given the hub cap such, for example, as a lustrous external finish or the like.

My invention is particularly concerned with the provision of a circular trim 20 for concealing the exposed outer side surfaces of the flanges of the tire rim 10 and for ornamenting the wheel by providing a novel cooperation between the same and the tire 9 on the rim.

This trim ring 20 is in accordance with the features of this invention made of relatively thin resiliently flexible plastic sheet such, for example, as ethyl cellulose. It may be fabricated in the manner to be described hereinafter in connection with Figure 4.

The trim is in the form of an annulus and is of a channeled configuration so that it presents a concave-convex contour. The radial depth of this ring together with its curvature are such as to cause the ring to appear to be a continuation of the side wall of the tire. This effect is also augmented by having the outer edge of the ring terminate adjacent the side wall of the tire. As shown at 21, the outer edge is offset rearwardly so as to overhang to a slight extent the outer edge of the tire rim 10.

I have found that by giving this trim ring a suitable external finish such, for example, as white or eggshell it is caused to appear to be a white side wall portion of the tire. In other words, it causes the tire to have a more massive appearance since the tire appears to extend clear down to the body part 11.

The inner periphery of the annular trim 20 is provided with a plurality of axially extending spaced projections 22 which may be in the same number as that of the wheel openings 12. As shown in Figure 4, there are four wheel openings and four projections 22 can be accommodated thereby, one for each wheel opening. These projections are formed integral with the body of the trim and may be fabricated for example in the manner to be described in connection with Figure 4.

As best shown in Figure 3, each of the projections 22 has fastened to its radially inner surface a spring clip designated generally by the reference character 23. It should be noted that the projections 22 extend rearwardly through the wheel openings 12 and along the under-surface of the base flange of the tire rim 10.

The spring clip 23 embraces two legs 24 and 26 which generally extend in the same direction. The leg 24 is fastened in any suitable manner to the under-surface of the projections 22 as by means of a rivet 25 or the like. The leg 26 is turned back over the leg 24 and has its free extremity provided with a hump 27 adapted to be cammed over an inner edge 28 of the wheel body which cooperates in defining the associated wheel opening 12.

The arrangement of the clips are such that the trim may be easily applied to the wheel by first aligning it with the wheel and with the projections in register with the respective wheel openings 12 and by thereafter pressing it axially so that the clips 23 are caused to enter the wheel openings and to be cammed over the rear edge 28 into retaining cooperation therewith as best shown in Figure 3.

The centering of the trim on the wheel may be facilitated by providing an opening 29 (Figure 2) in the trim through which the valve stems of the tire or tube is adapted to extend. Thus, by first lining up the trim with the valve stem it is possible to thereby likewise line up the projections 22 with the wheel openings 12.

In the retention of the trim on the wheel the flexibility of the plastic material of the projections 22 permits these projections to flex as the clips are pushed through the wheel openings 12 into retaining cooperation with the parts of the wheel. Thus, the projections 22 are tightly urged outwardly against the base flange of the tire rim or in other words the clips 23 are wedged between the wheel body part and the projections 22 which are held against the base flange of the rim.

The trim 20 may be removed by manually gripping the outer edge 21 and pulling on the trim ring until the clips are forcibly pulled back through the openings 12. The flexible characteristics of the trim 20 permits of its being flexed without being permanently distorted. Moreover, should in the use of the trim the same become slightly indented by reason of being struck against a curb or by pebbles striking the same, the trim will spring back to its original contour. This is highly desirable since it enables the trim to always present a pleasing appearance and also serves to prolong the useful life of the trim.

In Figure 4 I have illustrated how two trim sections 20—20 can be fabricated from a single channeled piece of stock 30. This channeled member 30 is made from continuous section of plastics which may be fabricated on any suitable equipment and then cut into predetermined lengths. Each length then has its ends joined on a transverse line, such as the line 31, so as to form a continuous annulus. Thereafter the annulus is cut on a medial plane so as to form two trim rings 20—20 each having oppositely facing projections 22 all of which are cut from the intermediate portion of the common channeled section 30. By fabricating the trim rings in this manner it is possible to make them very economically since waste is reduced to a minimum. Thereafter clips 23 are fastened to the projections 22.

It will, of course be understood that various details of construction may be varied through a wide range without departing from the principles of this invention and it is, therefore, not the purpose to limit the patent granted hereon otherwise than necessitated by the scope of the appended claims.

I claim as follows:

1. In a wheel structure including a wheel having multiflanged tire rim and body parts with spaced wheel openings therebetween, an annular wheel trim of curved cross-sectional contour such that the trim extends from the outer edge of the flanged rim radially inwardly to the wheel openings and covers the exposed surfaces of the rim flanges, said trim being made of plastic material which is self-sustaining as to shape and having an inner marginal portion thereof provided with resilient fingers formed to be resiliently pressed into said wheel openings to cooperate with the wheel parts in retaining the trim on the wheel, each of said fingers comprising a metal clip with one leg fastened to said inner margin of the trim and with another leg turned back over said first leg and free for resilient wedging engagement with one of the wheel parts, each free leg having a hump adjacent its extremity arranged to be cammed over and behind an edge of one of said wheel parts.

2. As an article of manufacture, an annular wheel trim of channeled cross-sectional shape with a serrated inner edge for telescoping cooperation with spaced openings in a wheel, spaced portions of said edge carrying resilient metal clips for snap-on trim-retaining engagement with the wheel.

3. In a wheel structure including a wheel having multi-flanged tire rim and body parts with spaced wheel openings therebetween, an annular wheel trim of curved cross-sectional contour such that the trim extends from the outer edge of the flanged rim radially inwardly to the wheel openings and substantially covers the exposed surfaces of the rim flanges, said trim having an inner margin thereof provided with circumferentially spaced portions formed to be pressed into the wheel openings to cooperate with the wheel parts in retaining the trim on the wheel, each of said portions including one leg fastened to said inner margin of the trim and another leg turned back over said first leg and free for retaining engagement with one of the wheel parts, each free leg having a portion adjacent its extremity arranged to be cammed over and behind an edge of one of said wheel parts.

GEORGE ALBERT LYON.

REFERENCES CITED

The following references are of record in the file of this patent:

UNITED STATES PATENTS

| Number | Name | Date |
| --- | --- | --- |
| 1,494,179 | Matthew | May 13, 1924 |
| 2,148,212 | Lyon | Feb. 21, 1939 |
| 2,279,331 | Lyon | Apr. 14, 1942 |
| 2,279,704 | Davenport | Apr. 14, 1942 |
| Re. 19,467 | Lyon | Feb. 12, 1935 |
| 2,279,333 | Lyon | Apr. 14, 1942 |
| 2,298,669 | Wood | Oct. 13, 1942 |